US008686576B1

(12) United States Patent
Smith

(10) Patent No.: US 8,686,576 B1
(45) Date of Patent: Apr. 1, 2014

(54) SYSTEM AND METHOD FOR HARVESTING ELECTRICAL ENERGY BY LINEAR INDUCTION

(75) Inventor: Alexander Paul Smith, Wharton, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 104 days.

(21) Appl. No.: 13/338,548

(22) Filed: Dec. 28, 2011

Related U.S. Application Data

(60) Provisional application No. 61/485,736, filed on May 13, 2011.

(51) Int. Cl.
*F02B 63/04* (2006.01)
*F03G 7/08* (2006.01)
(52) U.S. Cl.
USPC ............................................. 290/1 R

(58) Field of Classification Search
USPC ....... 290/1 R, 1 E; 310/12, 13, 14, 15, 23, 27, 310/30, 34, 36
See application file for complete search history.

(56) References Cited

U.S. PATENT DOCUMENTS

| 3,758,824 | A  | * | 9/1973  | Warneke ........................ 315/246 |
| 6,812,598 | B2 | * | 11/2004 | Cheung et al. .................. 310/30 |
| 2007/0052302 | A1 | * | 3/2007  | Cheung et al. .................. 310/12 |
| 2009/0084015 | A1 | * | 4/2009  | Compton et al. .............. 42/1.02 |
| 2009/0108589 | A1 | * | 4/2009  | Racho ........................... 290/1 R |
| 2012/0104877 | A1 | * | 5/2012  | Isaacs ............................. 310/30 |

* cited by examiner

*Primary Examiner* — Tulsidas C Patel
*Assistant Examiner* — Thomas Quigley
(74) *Attorney, Agent, or Firm* — Michael C. Sachs

(57) ABSTRACT

A linear induction generator for use in a weapon system comprising a matrix of coils, a matrix of magnets, a spindle assembly, a matrix of coils, and a dust cover there over. This generator is mounted onto a weapon receiver of the weapon system to generate raw electric current. The raw current is then rectified and delivered to either a battery or directly to the electronic devices.

21 Claims, 15 Drawing Sheets

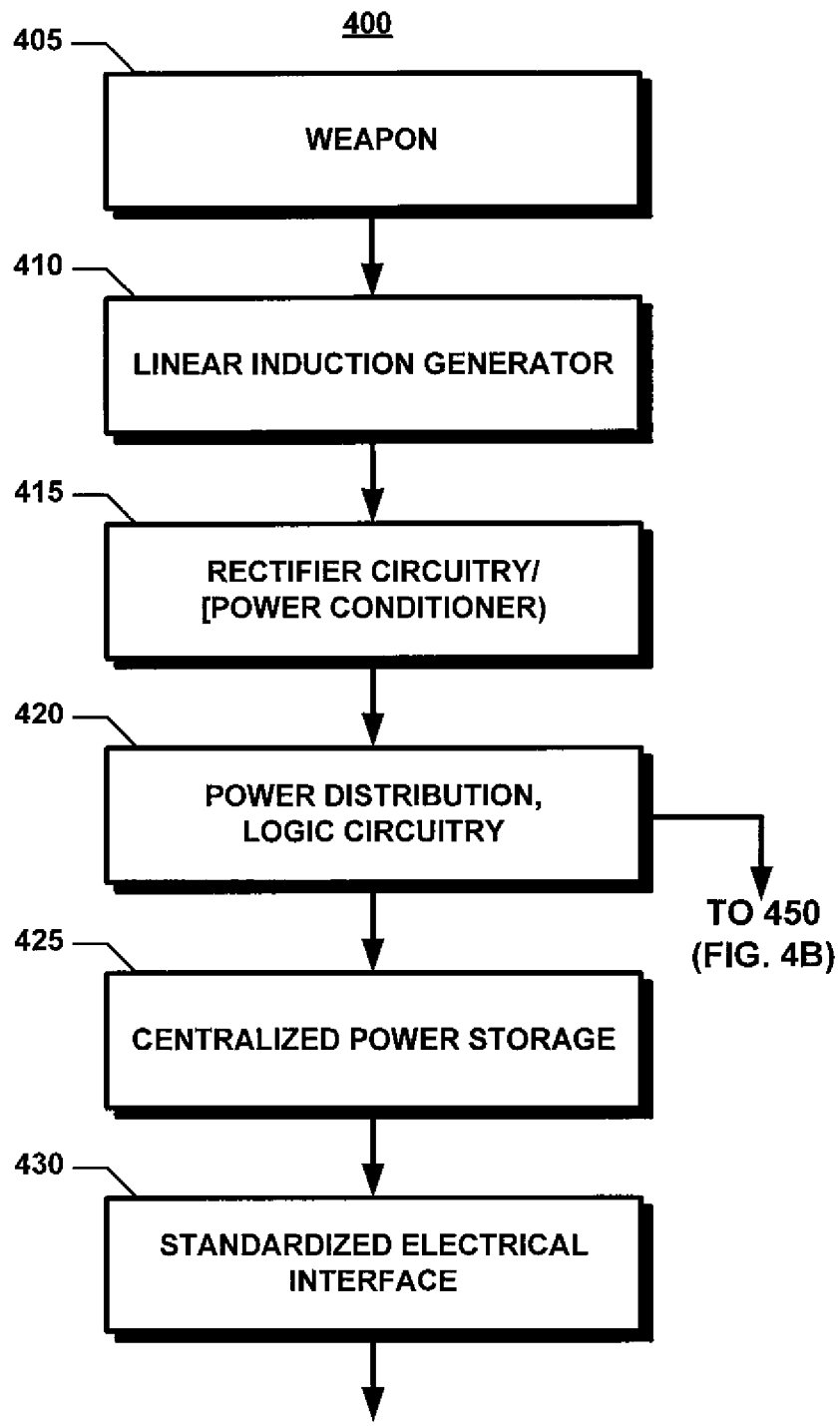
FIG. 4A  TO 435 (FIG. 4B)

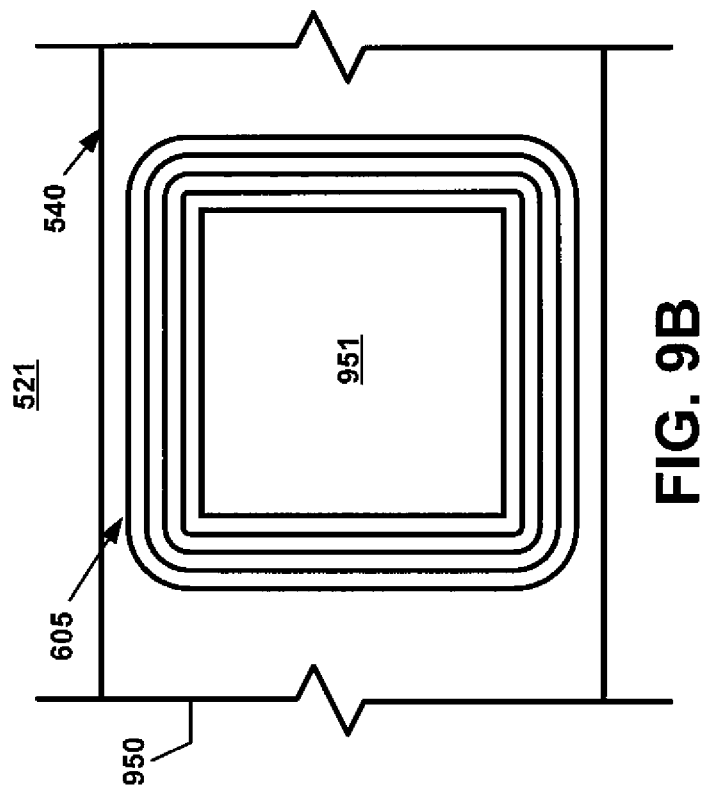
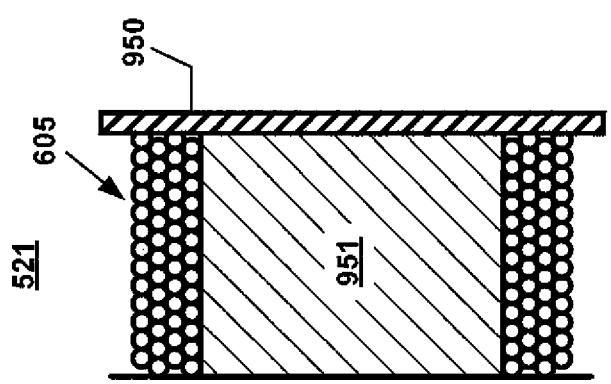
FIG. 9B
FIG. 9A

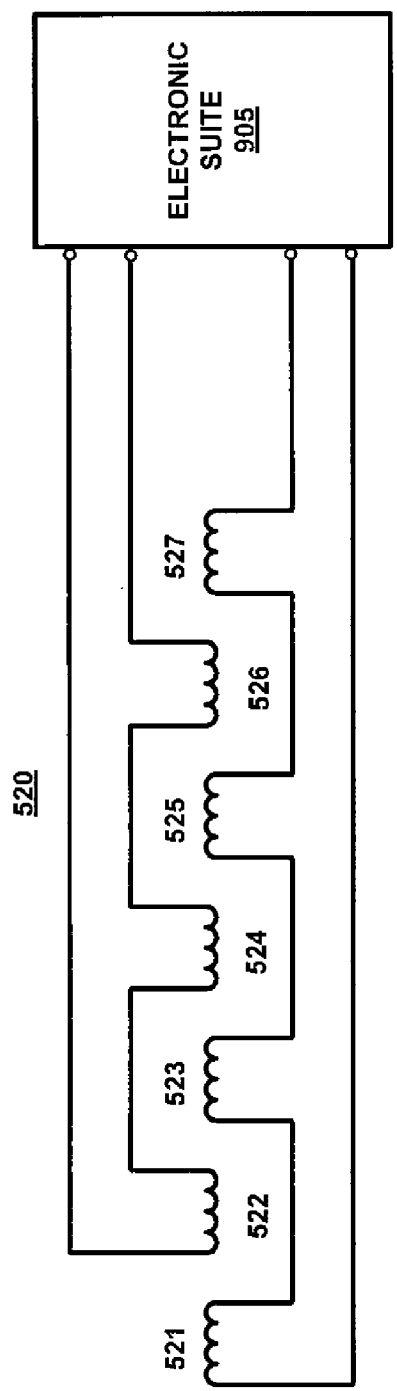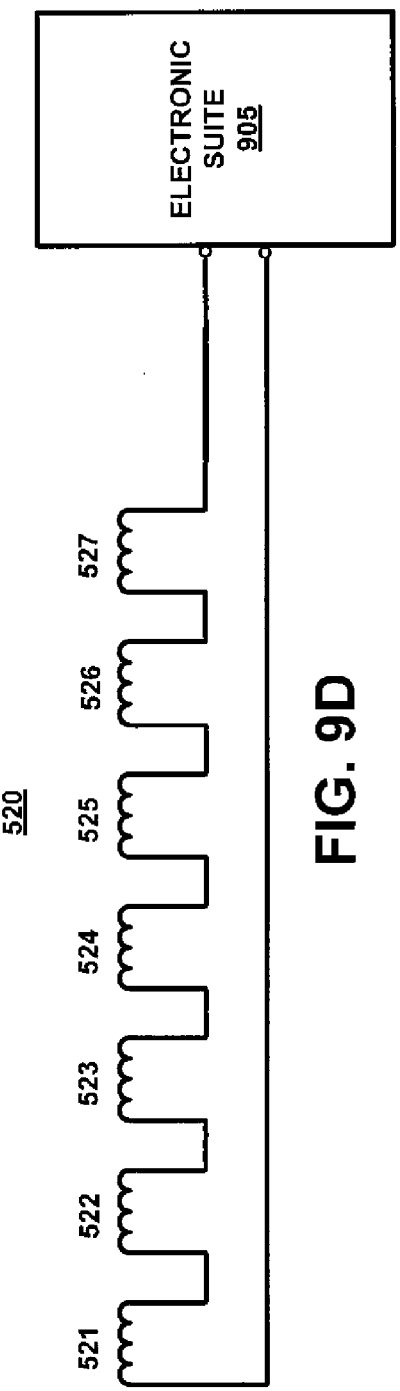

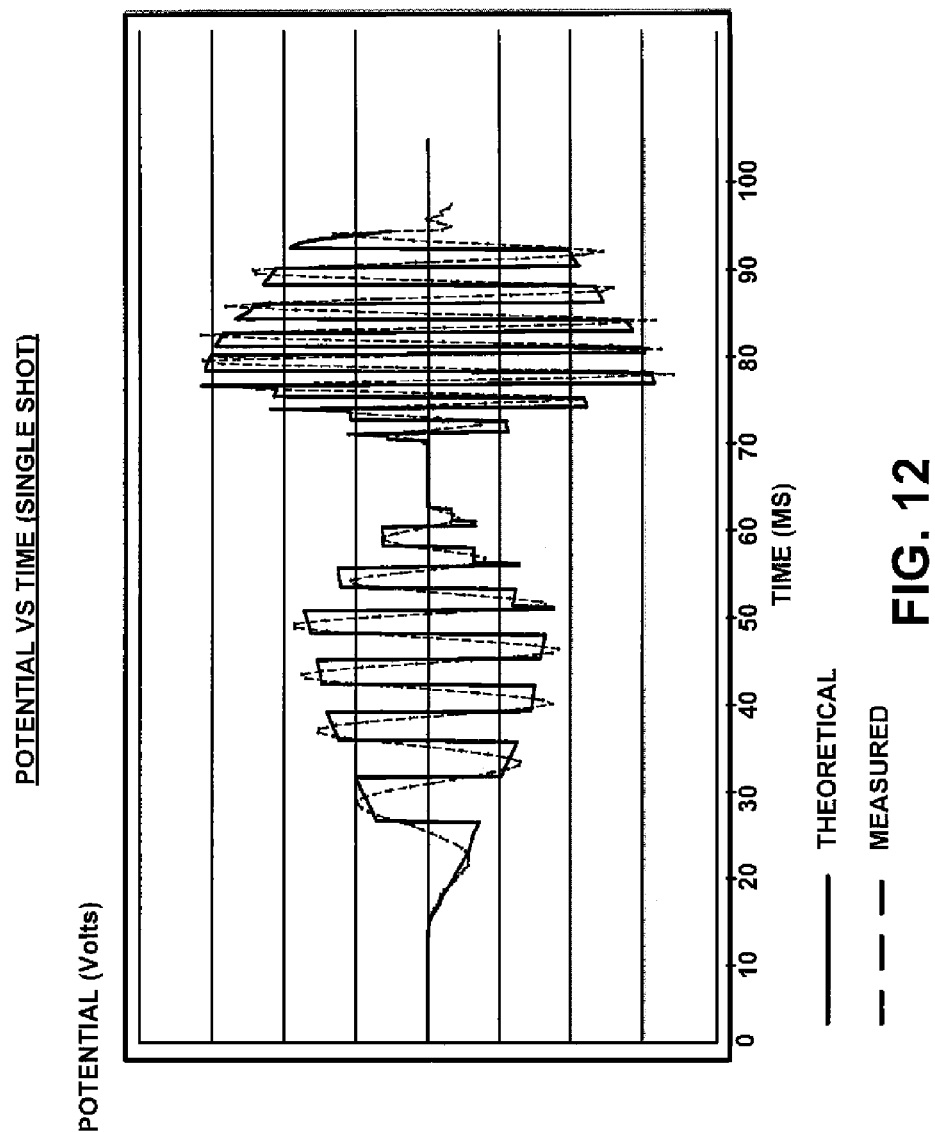

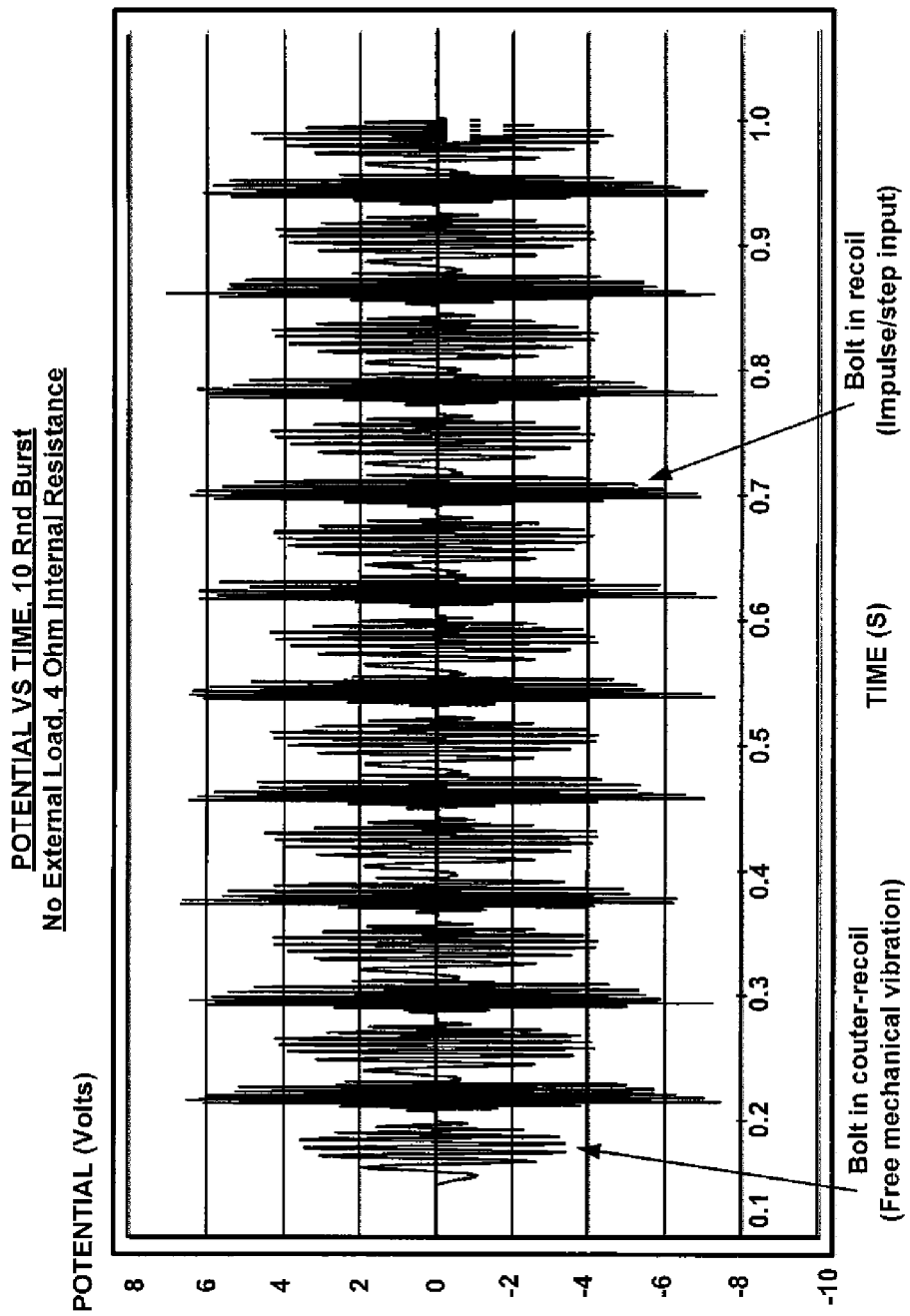

SYSTEM AND METHOD FOR HARVESTING ELECTRICAL ENERGY BY LINEAR INDUCTION

CROSS-REFERENCE TO RELATED APPLICATIONS

This application claims the benefit under 35 USC §119(e) of U.S. provisional patent application 61/485,736, filed on May 13, 2011, which is incorporated by reference in its entirety.

GOVERNMENTAL INTEREST

The invention described herein may be manufactured and used by, or for the Government of the United States for governmental purposes.

FIELD OF THE INVENTION

The present invention relates in general to the field of energy harvesting, particularly in small arms weapon systems, by linear induction. More specifically, this invention relates to resolving the persistent need of the modern warfighter for readily available, portable electric power on the battlefield, by providing a self-powering or charging capability for the electronic devices.

BACKGROUND OF THE INVENTION

Equipment incorporating electronics components, such as magnifying optics, telecommunications/navigation equipment, night vision, range finders, laser designators, and other similar devices, have become indispensible to the soldier particularly on the battlefield. New electronic devices are constantly being developed and deployed as well.

This technology increases the efficiency and safety of the soldiers. In addition, the soldiers' missions are rendered more survivable by enabling rapid identification, situational awareness, and target engagement. While these technological advances provide the armed forces with an important advantage in battle, they also present inherent logistics problems.

More specifically, the batteries that support the electronic devices have a finite life. Even rechargeable battery technology is of limited use to a fielded and fighting soldier. It is common practice to replace batteries going into combat at least daily. Shortage of fresh batteries and the possibility of depletion while in combat pose a serious threat to the modern soldier trying to exploit the enhanced fighting capabilities technology.

It would therefore be desirable to offer self-powering capability for these electronic devices, or a means of battery recharging, while operating away from a power grid. In this way, both the gross mass of batteries needed to operate in the field, and the likelihood of electronics power failure during hot combat would be reduced.

However, there are numerous challenges associated with practically capturing electrical energy from the rounds that are shot from a weapon, because significant energy is wasted in mechanical motion and heat. Modern automatic weapons such as an M16 assault rifle, M4 carbine, M249 squad automatic weapon, and a whole plethora of commercial and military small arms, operate by imparting a portion of a fired round's expanding gas force to cycle the gun's mechanism.

The weapon is generally designed to extract and eject a spent round from the gun barrel, load a subsequent round, and trigger some firing device, all within a fraction of a second. The moving parts therefore must translate in a back and forth manner at high velocities, where speeds exceeding 20 feet per second are not uncommon, at certain times during the recoil and counter-recoil (return) portions of the M249's operation cycle.

What is therefore needed is an advanced system and associated method that uses this high cyclic rate and high speed linear action for capturing electrical energy. Prior to the advent of the present invention, the need for such an optimization framework has heretofore remained unsatisfied.

SUMMARY OF THE INVENTION

The present invention satisfies this need and describes novel embodiments of a linear induction generator for use in a weapon system to harvest energy by linear induction. More particularly, the linear induction generator resolves the persistent need of the modern war-fighter for readily available, portable electric power on the battlefield, by providing a self-powering or charging capability for the electronic devices.

According to a preferred embodiment, the linear induction generator is mounted (or retrofit) on a weapon to generate raw electric current (or potential). A rectifier circuit (or power conditioner) rectifies and filters (or transforms) the raw electric current (or voltage) to a standard (or useable) current (or voltage). The rectifier circuitry rectifies and smoothes the raw signal, since the output response needs to be of a uniform or near uniform direct-current in order to charge a battery or to operate most small electronics. The rectifier circuit preferably employs a full wave rectifier to capture the entirety of the raw signal. Coupled to a resistor-capacitor filter, the desired voltage can be output and ready for use.

A power distribution logic circuit distributes or channels the usable waveform (current or voltage) either to a centralized power storage, or directly to the device being utilized. A notional system includes a centralized power storage unit, in the form of batteries, capacitor banks, or some other means and permanently mounted with the weapon.

A standardized electrical interface connects the centralized power storage to a standardized rail mounting system. A standardized electrical interface connects the standardized rail mounting system to the battlefield electronics or devices.

The linear induction generator generally includes a matrix of coils, a matrix of magnets, a spindle structure (or spindle assembly), and a dust cover. The linear induction generator is mounted externally to a weapon receiver of the weapon. The coils may be connected in series, in parallel, or in a combination thereof. The matrix of magnets comprises several magnets and is mounted oppositely to the coils.

The electrical potential generated by the linear induction generator will be the same whether the magnetic field generated by the matrix of magnets is fixed, or whether the matrix of coils is fixed, so long as a relative motion exists between the matrix of magnets and the matrix of coils.

BRIEF DESCRIPTION OF THE DRAWINGS

The above and other features of the present invention and the manner of attaining them, will become apparent, and the invention itself will be best understood, by reference to the following description and the accompanying drawings:

FIG. 9A is a side cross-sectional view of one coil mounted on a spindle according to the present invention;

FIG. 9B is a front elevational view of the coil and the spindle of FIG. 9A;

FIG. 9C is an electrical circuit diagram illustrating the connection of the coils, according to one embodiment of the present invention;

FIG. 9D is an electrical circuit diagram illustrating the connection of the coils, according to another embodiment of the present invention;

FIG. 12 is a representative waveform illustrating an alternative current output, consistent with polarity switching in the linear induction generator of the present invention; and FIG. 13 is a representative chart illustrating a recorded voltage signal upon firing a 10-round bust from the weapon system of FIG. 5.

DETAILED DESCRIPTION OF PREFERRED EMBODIMENTS

The present invention utilizes the potential to extract usable electrical energy from the kinetic energy associated with the operation of an automatic weapon. There are several challenges associated with practically capturing this power. From an energy conservation standpoint, however, the high cyclic rate of the weapon mechanism and the high speed linear action are favorable for energy capture by linear induction.

The general principle behind electricity production in generators, whether linear or rotary, is Faraday induction. Faraday induction is based on the concept that a conductor that moves relative to a surrounding magnetic field (or vice-versa) will experience an induced electrical current that is directly proportional to the relative speed. In a conventional generator, conductive loops of wire rotate within a fixed magnetic field created by either permanent or electro-magnets. Current is generated because the wire coils are changing their orientation with respect to the fixed field. The rate change over time of this quantity, called magnetic flux, is equal to the potential difference (voltage) across the terminals of the loop. Depending on the load that is attached to this circuit, more or less electrical amperage or current is transmitted to this load (e.g., a light bulb).

More specific to the present invention is the concept of linear induction, which is the application of the Faraday induction principle to a conductor-field pair that translates with respect to one another instead of rotating. While more difficult to set up, given the same magnetic field and same relative motion, an identical potential difference will be created.

Figure 1:
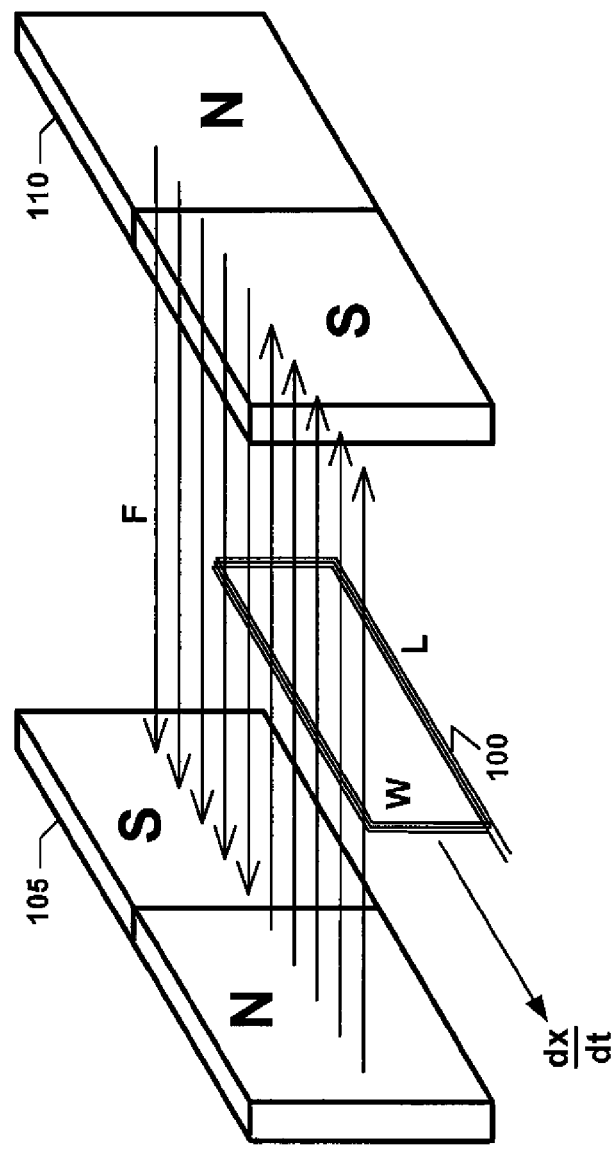
FIG. 1 is a simplified drawing that illustrates the concept of operation of a linear induction generator according to one embodiment of the present invention.
Figure 2:
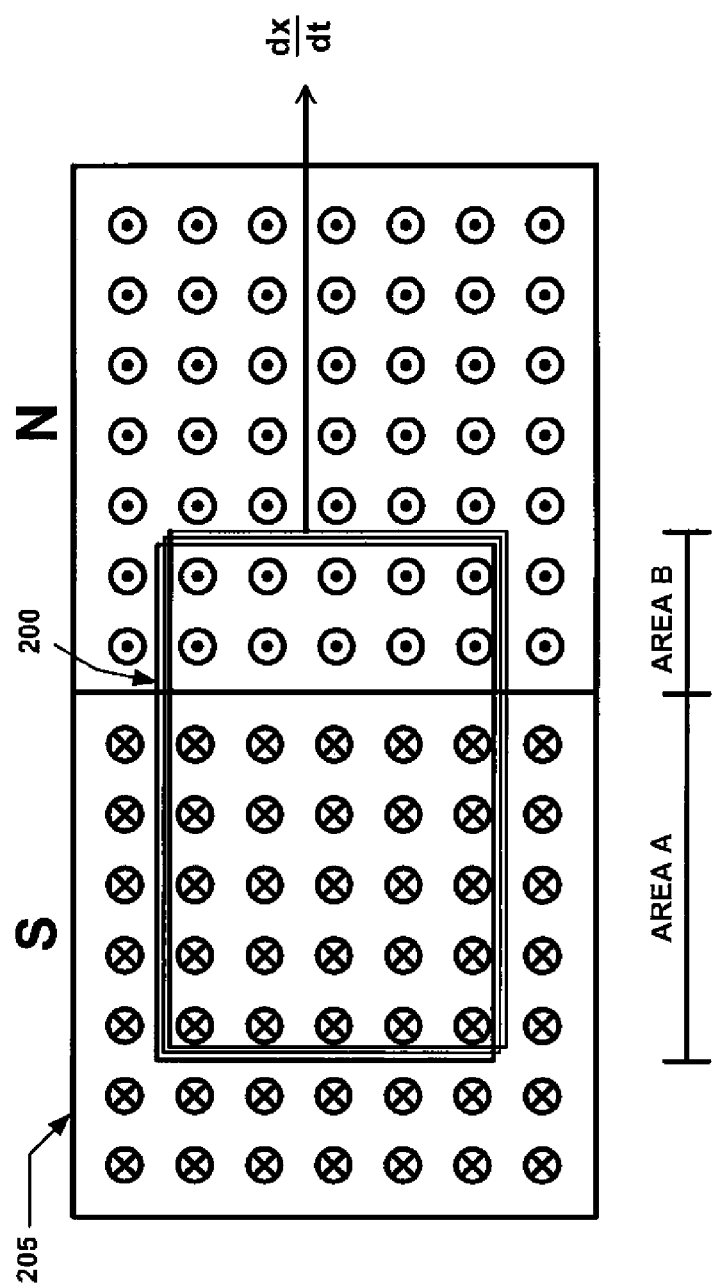
FIG. 2 is a simplified drawing that illustrates the concept of operation according to another embodiment of the present invention.
Figure 3:
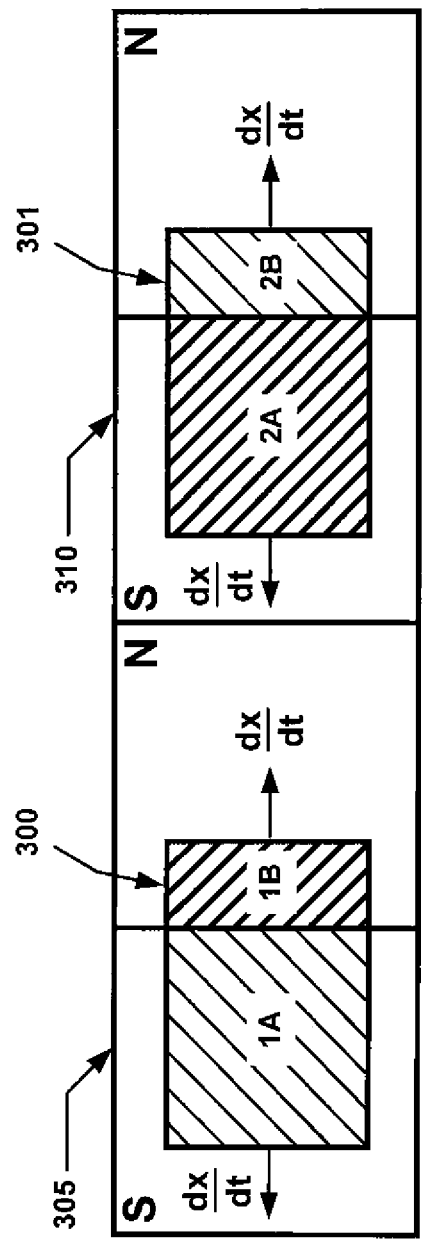
FIG. 3 is another concept illustration of the operation of the linear induction generator of FIG. 2.

As shown in FIGS. 1, 2, and 3, a conductive wire loop (or coil 100, 200, 300, 301) moves through a fixed magnetic field, F, that can be generated by either opposing magnets 105, 110 (FIG. 1), a single magnet 205 (FIG. 2), or a plurality of adjacently, co-planarly disposed magnets 305, 310. While only one or two magnets are illustrated in FIGS. 1, 2, and 3, it should be clear that a larger number of magnets may also be used for increased output.

Because the wire loop 100 is passing from one oriented field (e.g., S) to an oppositely oriented field (e.g., N), the enclosed areas (Areas A, B, FIG. 2) and therefore the fluxes, are either increasing or decreasing at a rate proportional to the velocity (dx/dt) of the relative motion (linear translation) of the wire loop 200. A decreasing flux occurs at a positively oriented field (Area A) and an increasing flux occurs in a negatively oriented field (Area B). The potential across the terminals of the wire loop 200 can be superimposed and summed. In this manner, the voltage generated is twice that of a single loop-magnet coupling. This pole-pairing is important to high yield.

As more clearly illustrated in FIG. 3, the coils 300, 301 linearly translate back and forth relative to the magnets 305, 310, along two opposing directions, at either the same (or different) translation speeds (or velocities). In a different arrangement, the coils 300, 301 can be fixed and the magnets 305, 310 translate relative to the coils 300, 301.

An important feature of the present invention is the use of multiple pole pairs to produce additional yield. As shown in FIG. 3, each pole pair 305, 310 is a pair of magnetic fields in the staggered configuration, paired up with one bundle of conductive loops 300, 301, respectively. The area labeled 1A experiences a decreasing flux in a negative magnetic field, while the area labeled 2B experiences a decreasing flux in a positive magnetic field. Because the loop (or coil) is a single circuit, current is induced from both areas in the same direction. The same is true of areas 1B and 2A. Ideally, the length of the loops (in the direction of travel) is equal to the length of each magnet for maximum output. The output can be multiplied by the number of pole pairs used on the system.

Mathematically, the electrical potential, $\epsilon$, is proportional to the sum of changing areas of flux and the field strength, B, at the wire loop, 100, as follows:

$$\varepsilon = \frac{d\Phi_B}{dt} = \sum B \frac{dA}{dt} = \sum Bw \frac{dx}{dt}$$

Magnetic flux is defined as the total "quantity" of a magnetic circuit's field lines passing through an enclosed conductor. In the present configuration, a delta flux is produced when the conductor or wire loop 100 moves more or less into the field perpendicular to it normal direction. This area is defined as its width "W" by its length "L". The length, L, which is immersed at a given time in a particular field, changes proportionally to the speed of translation of the wire loop 100, with its width, W, remaining constant. The derived relationship, then, reveals that the output is a directly proportional to the strength of the magnetic field, the conductor geometry, and the speed with which they are moving with respect to one another. Each additional loop added to the circuit will contribute in the same fashion.

An exemplary embodiment of the present invention includes a means to retro-fit a currently fielded weapon to accept the necessary components: conductive loops, magnetic field, and electronics suite to condition and distribute power either directly to electronics or to a battery charging unit. In a preferred embodiment, powerful permanent magnets are attached on the translating components and the conductive wiring circuit is affixed to the weapon receiver in close proximity to the magnets.

The opposite arrangement, where the magnetic field is stationary is also anticipated by the present invention, although a means of sliding contact/brush contact with the translating wiring would be added for a proper operation of the present invention.

Figure 4B:
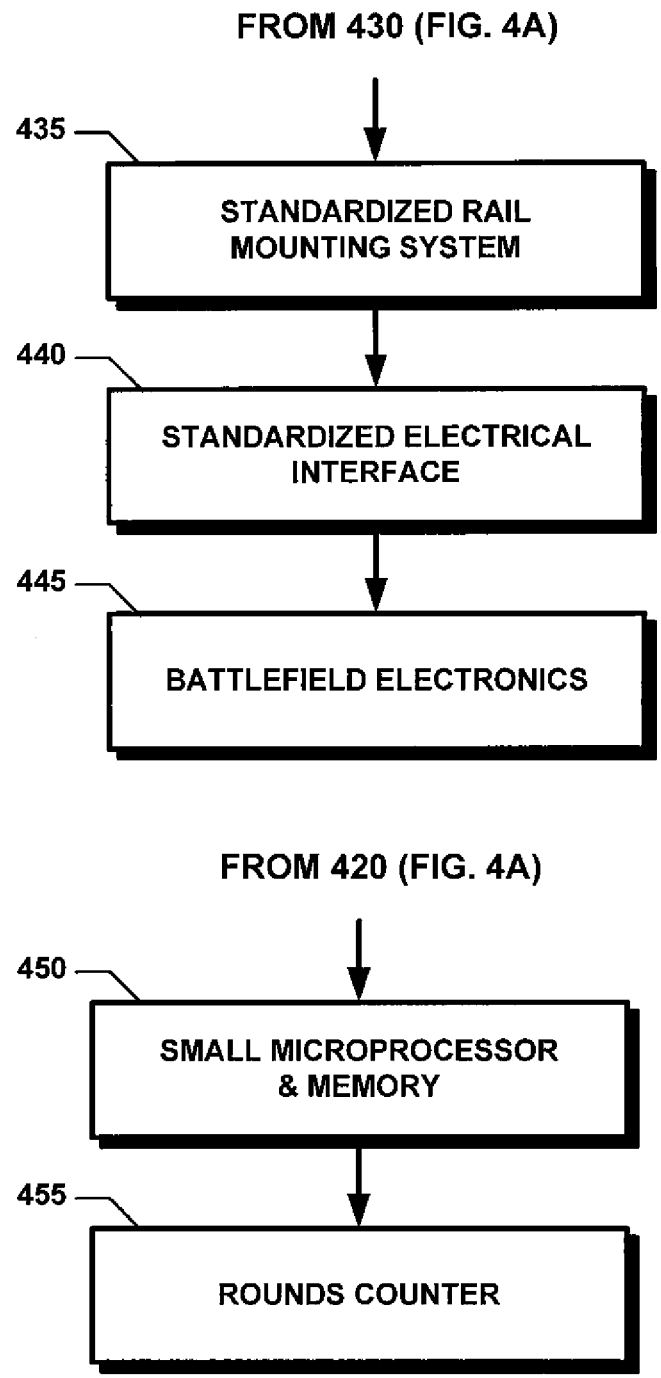
FIG. 4 is comprised of FIGS. 4A and 4B, and represents a block diagram that illustrates a system using the linear induction generator of FIGS. 2 and 3, for harvesting electrical energy by linear induction, according to the present invention.

FIG. 4 is an exemplary block diagram that illustrates a system 400 for harvesting electrical energy by linear induction, according to the present invention. A linear induction generator coil matrix 410 is mounted (or retrofit) on a weapon 405 to generate raw electric current (or potential).

A rectifier circuit (or power conditioner) 415 rectifies and filters (or transforms) the raw electric current (or voltage) to a standard (or useable) current (or voltage). The rectifier circuitry rectifies and smoothes the raw signal, since the output response needs to be of a uniform or near uniform direct-current in order to charge a battery or to operate most small electronics. The rectifier circuit 415 preferably employs a full wave rectifier to capture the entirety of the raw signal. Coupled to a resistor-capacitor filter, the desired voltage can be output, and ready for use.

A power distribution logic circuitry 420 distributes or channels the usable waveform (current or voltage) either to a centralized power storage 425, or directly to the device 450 being utilized. A notional system includes a centralized power storage unit 425, in the form of batteries, capacitor banks, or some other means and permanently mounted with the weapon. This power source would, for example, be linked to a pre-existing MIL-STD-1913 rail mounting system which is modified to include a standard electrical interface. Though a paradigm shift in battlefield electronics would be necessary, if lasers, optics, range finders etc., were to entertain the same interface, connection would be accomplished through the act of mounting the device to the rail.

A standardized electrical interface 430 connects the centralized power storage 425 to a standardized rail mounting system 435. A standardized electrical interface 440 connects the standardized rail mounting system 435 to the battlefield electronics or devices 445.

At least some of the rectifier circuitry 415, the power distribution logic circuitry 420, the centralized power storage 425, the centralized power storage unit 425, the standardized electrical interfaces 430, 440, the battlefield electronics or devices 445, the microprocessor and memory 450, and/or the round counter 455 may be selectively mounted onto the weapon 405, or in close proximity thereto.

The same concept of the present invention is applicable to retro-fitted weapons as well as new weapon systems. According to the present invention, the gap distance (or clearance) between the magnets and the coils needs to be precisely controlled. Additionally, the space on translating components would be reserved for the secure mounting of magnets. The electronics suit would be integral to the system 400 as well.

Further applications of the present invention are also possible. As the waveform of each complete firing cycle is known, a small microprocessor 450 would be able to determine the number of rounds 455 fired in a given period of time. Located at the rectifier-filter circuit 415, the number of maxima and minima voltage recordings could be converted into a simple rounds counter that could facilitate in weapon accountability and preventative maintenance.

Figure 5:
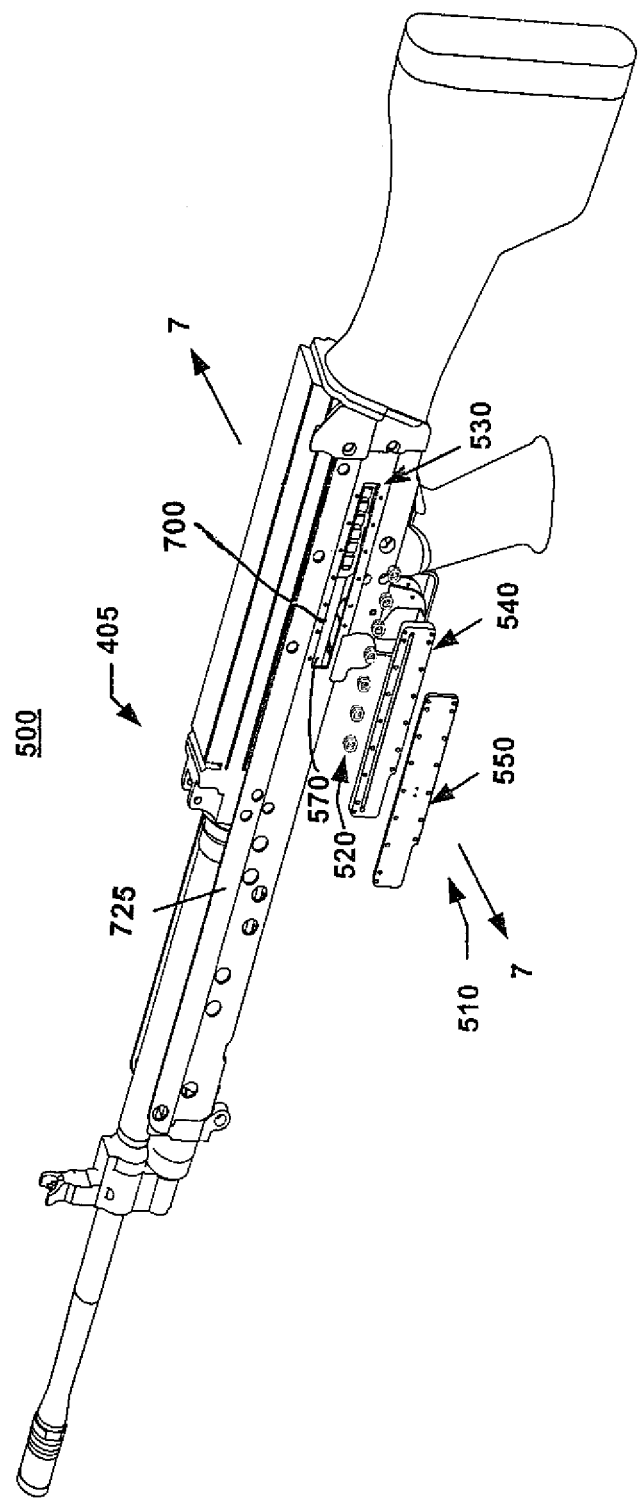
FIG. 5 is an isometric, exploded view of a weapon system that uses the linear induction generator of FIGS. 2-4, according to the present invention.
Figure 6:
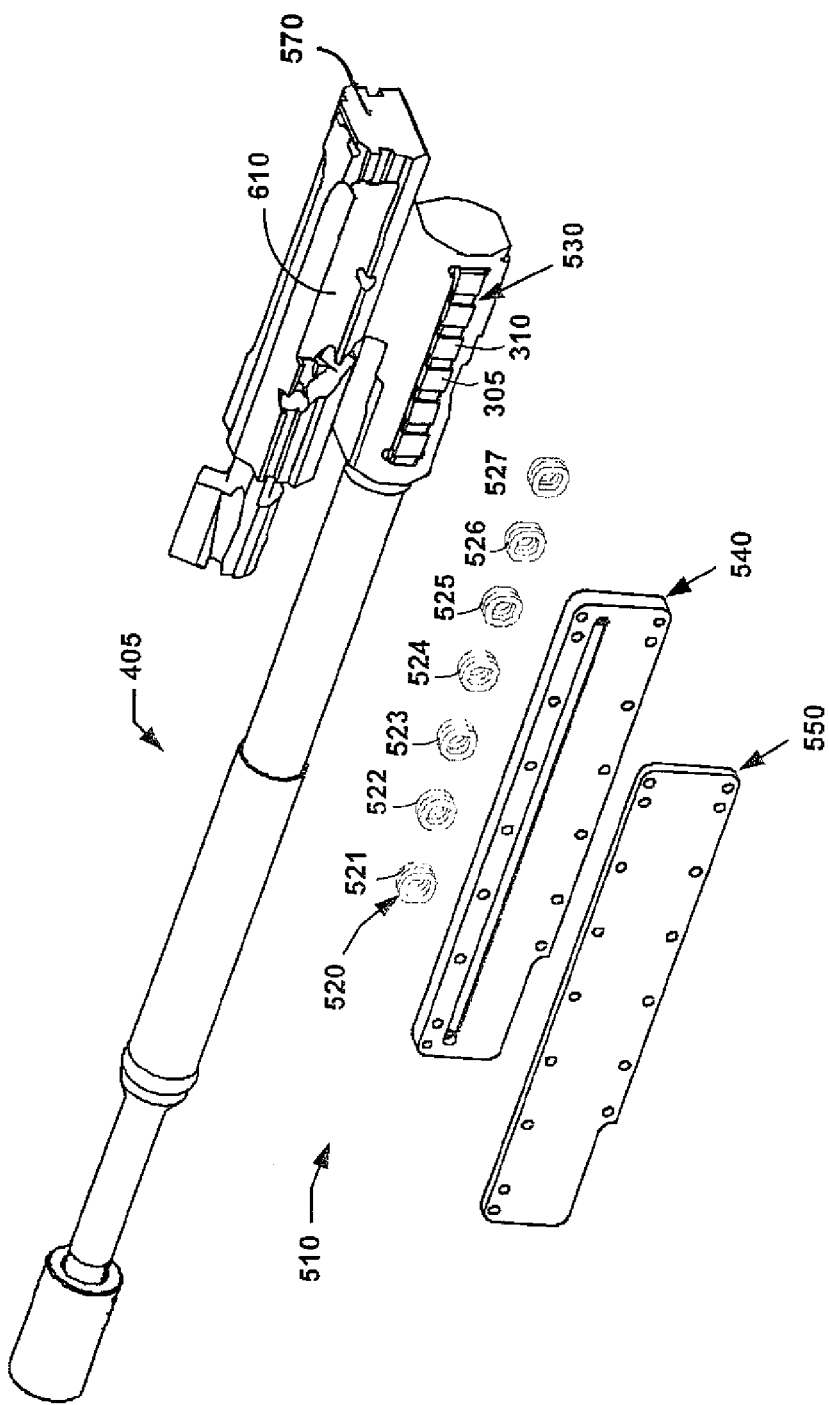
FIG. 6 is an exploded view of the linear induction generator of FIGS. 2-4, according to the present invention.

FIGS. 5 and 6, illustrate a weapon system 500 as including the weapon 405 and the linear induction generator coil matrix 410. The linear induction generator 510 generally includes a matrix of wire coils 520, a matrix of magnets 530, a spindle structure 540, and a sturdy dust cover 550.

The linear induction generator coil matrix 410 is mounted externally to a weapon receiver 725 of the weapon 405. While in this exemplary embodiment seven coils 521, 522, 523, 524, 525, 526, 527 are illustrated, it should be understood that a different number of coils may be used, depending on the weapon 405. The coils 521, 522, 523, 524, 525, 526 may be connected in series, in parallel, or in a combination thereof. The matrix of magnets 530 comprises several magnets, such as those illustrated and described in relation to FIGS. 1, 2, 3.

The electrical potential generated by the linear induction generator coil matrix 410 will be the same whether the magnetic field generated by the matrix of magnets 530 is fixed, or whether the matrix of coils 520 is fixed, so long as a relative motion exists between the matrix of magnets 530 and the matrix of coils 520.

To achieve this configuration on a small system, such as the M249 SAW or M4 carbine, relatively small magnets 530 are mounted to a moving element (e.g., weapon receiver 725) of the weapon 405, without degrading or impeding the operation of the weapon 405. The current output will be affected by the lower field strength of the smaller magnets, as a result of the smaller dimensions and larger air gap/clearances. However, the current output can be augmented the number of magnets of the matrix of magnets 530, so as to create continuous superposition along as much of the cycle as possible.

With further reference to FIG. 9, each coil (e.g., 521) produces a voltage that is proportional to the number of loops 605 contained therein. The per-coil output is proportional to the number of loops 605. In one embodiment, the coils are connected in parallel to output a higher current/amperage at lower voltage. In another embodiment, the coils are connected in series so that the voltage is greatly increased at the cost of the current. High voltage is desirable because it can be transmitted with less loss, and it can further run through the power conditioning circuitry 415 with less loss. The ultimate application of this power, however, will determine which configuration is more suitable. For example, direct powering of an electronic device would favor higher voltage versus higher current to charge a battery.

Figure 8:
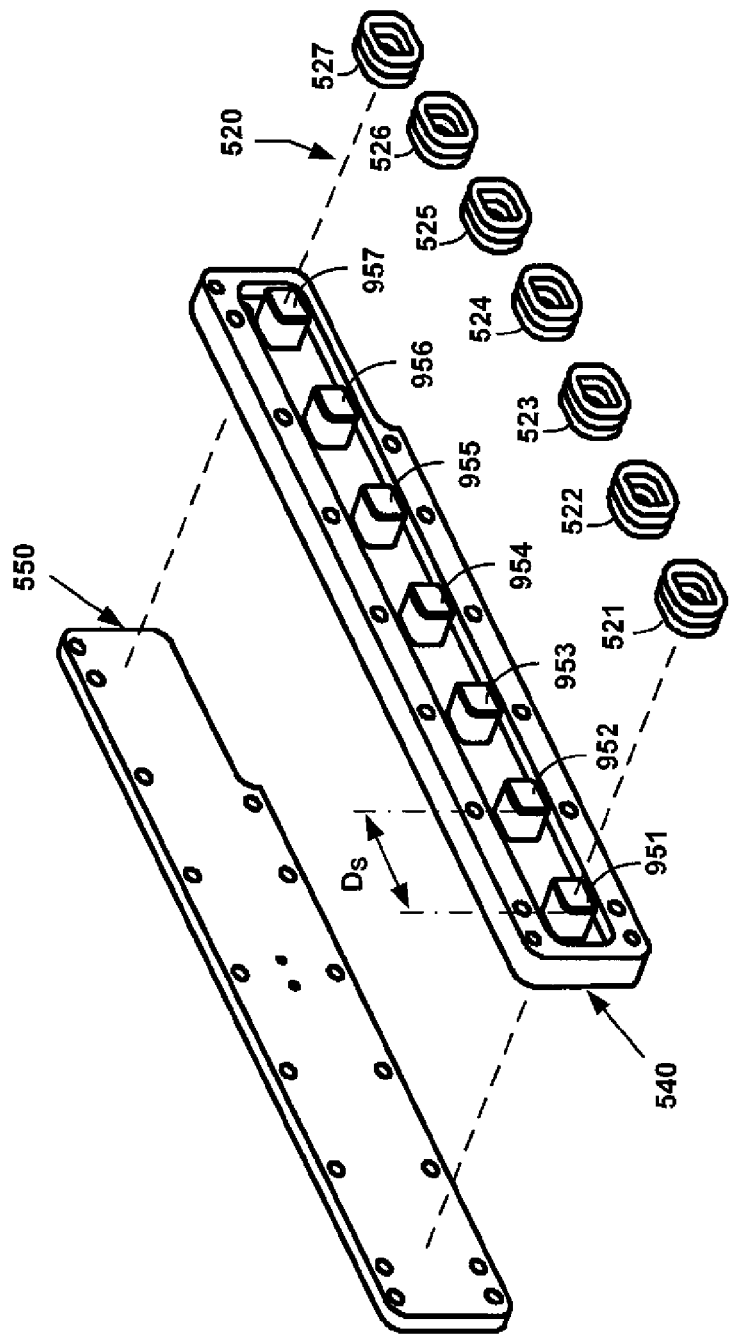
FIG. 8 is an enlarged, exploded view of the linear induction generator of FIG. 6.

FIGS. 8, 9 illustrate the structure of an exemplary coil (e.g., 521) in detail, with the understanding that in a preferred embodiment, the coils (521-527) are similar in shape and configuration. The coil 521 is tightly wound to increase the loop density. Preferably, the number of coils and wire gauge are chosen to develop an internal resistance in the circuit that is similar in magnitude to the load impedance of whatever it is powering. In this way, maximum power transfer to a specific device can be achieved.

As illustrated in FIG. 9C, and according to one embodiment of the present invention, adjacent bundles, e.g., 521, 522, are not wired together. Instead, every other coil e.g., 521, 523 is wired together. In order to maximize the loops in the limited amount of space, the coils are placed immediately next to one another. Similarly, each magnet pole pair 305 (a negative field, adjacent to a positively vectored field) is positioned without clearance. By disconnecting adjacent coils, there is no negation that would occur when one coil attempts to produce a clockwise current and the next produces a counterclockwise current, as would occur when both coils are over the same pole-pair. The two adjacent coils e.g., 521, 522, are connected at an electronics suite 905 where the circuit winding direction is reversed and superposition can apply. This feature allows for the greatest loop density without incurring significant losses.

Another embodiment of the present invention is illustrated in FIG. 9*d*. Adjacent coils 521, 522 are wired together. However, in order to minimize the current negating affect described above, clearance must be developed between each coil and correspondingly, each magnet. This is achieved by physically separating the coils at the coils structure, and separating the magnets with a non-ferrous spacer. Mounting the magnets between non-ferrous spacers increases the physical distance between the magnets, and thus opposite field lines that may cross the loops. Additionally, this may help contain the field by breaking apart the continuity of the circuits the magnets try to form internally. This configuration eliminates the need to rejoin the two induced currents and is easier to manufacture.

Another feature that optimizes power yield is the spindle structure 540 (FIGS. 8, 9A, 9B) which accepts the wire bundles (e.g., 605) of the coils (e.g., 521) and which maintains their geometry. The spindle structure 540 includes a base 950 and a plurality of spindles (e.g., 951, 952, 953, 954, 955, 956, 957) are formed. The spindles (951-957) are separated by a distance, $D_S$, which is preferably equal to the length of the magnet in the direction of travel.

While acting as a structural member, the spindle structure 540 is also important in reducing losses due to leaked magnetic field. The spindle structure 540 may be constructed either of an iron laminate or a ferrite ceramic.

Figure 10:
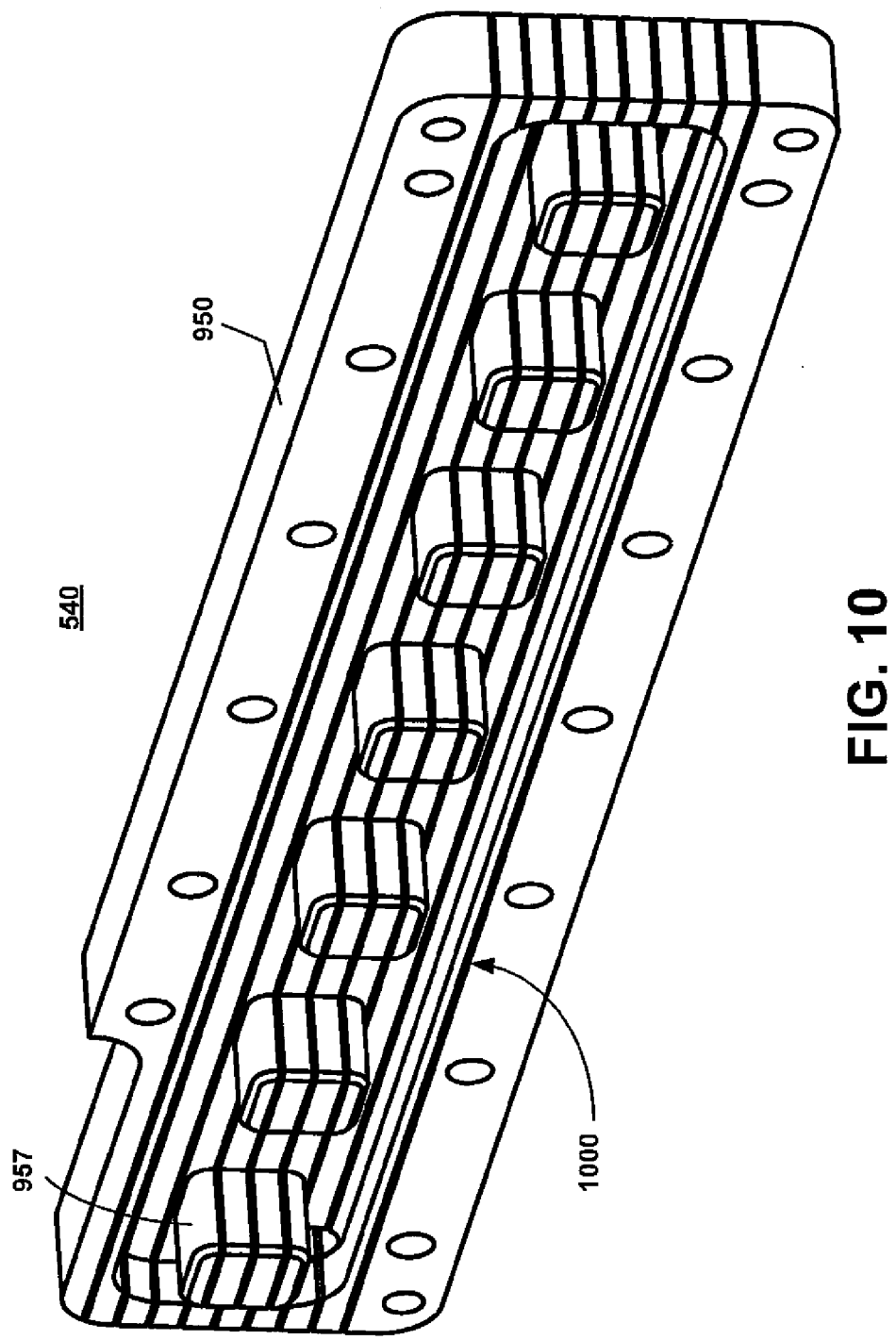
FIG. 10 is an enlarged, isometric view of a spindle assembly according to another embodiment of the present invention.

FIG. 10 illustrates the embodiment wherein the spindle structure 540 is constructed of an iron laminate 1000. Iron has the advantage of being easily machineable but is very conductive electrically, enabling eddie currents to form within the cores or spindles themselves. This in turn induces internal, random magnetic fields which may counteract the protagonist field. The iron core used in the invention calls for separating the cores against the direction of the moving magnetic field. This would reduce the area over which large eddies could form and increase efficiency. The iron laminate 1000 is depicted as a series of thin, vertically stacking sections that are bonded with an insulating varnish or epoxy layer.

In the alternative embodiment where ferrite ceramic is used to form the spindle structure 540, termites can have extremely high permeability and have the added benefit of being fairly resistive and light weight, being less dense than iron. They are metal-loaded ceramics with random grain structure which greatly increases the core's efficiency. However, they are relatively brittle, difficult to machine, and costly.

Figure 7:
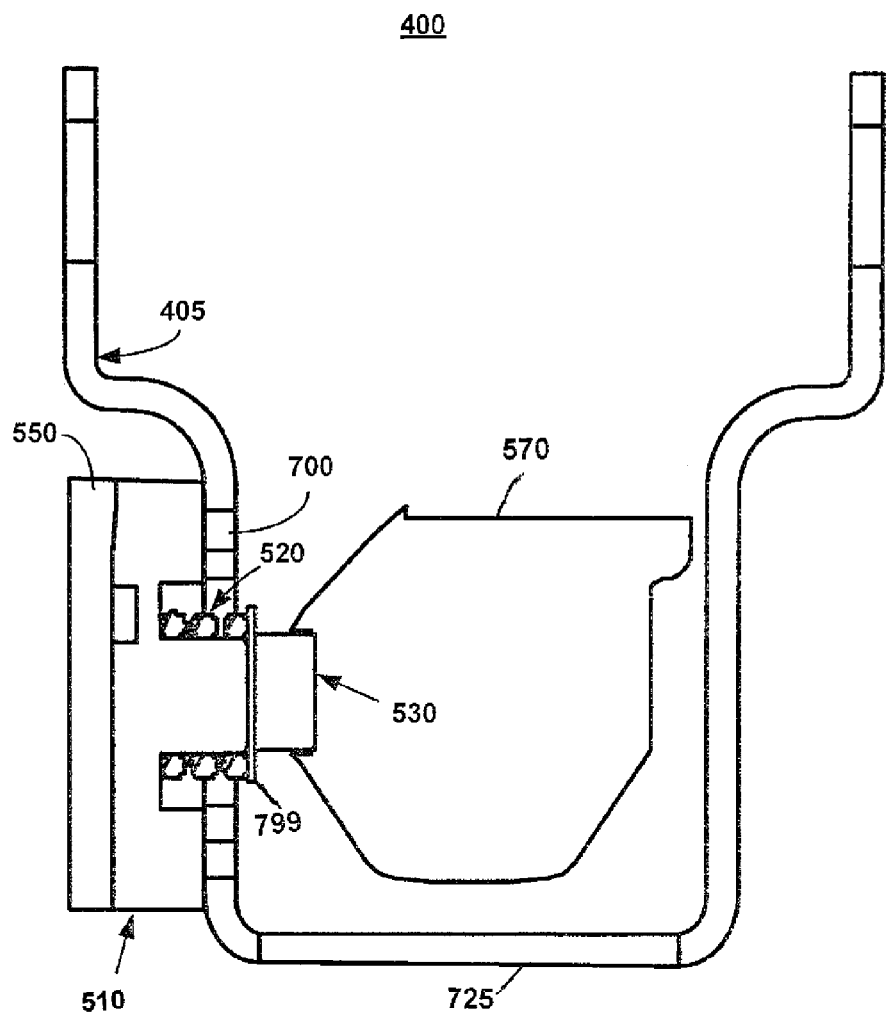
FIG. 7 is a rear, cross-sectional view of the weapon system of FIG. 5, taken along line 7-7 thereof.

An additional important feature is that the spindle structure 450 includes a thin layer of an adhesive backed, wear resistant, low friction film, such as polytetrafluoroethylene (TEFLON), as shown in FIG. 7. This layer serves to physically maintain a gap between the matrix of the translating magnets 530 on a operating group 570 (FIG. 5) of the weapon receiver 525 and the wire loops.

FIG. 7 illustrates the assembled weapon system 500 as a unit. The linear inductor generator coil matrix 410 is fastened to the weapon receiver 725 by the dust cover 550. The weapon 405 is only slightly modified in that a cutout 700 in the weapon receiver 725 in the area of the operating group 570 is created. The dust cover 550 is sufficiently sturdy so that when bolted across the gap, the weapon integrity is preserved.

The other main component of the linear induction generator coil matrix 410 is the translating magnetic field, which is comprised of the matrix of high power magnets 530 and the weapon operating group 570. As shown in FIGS. 1-6 and 7, the magnets, e.g., 305, 310, are arranged with opposite poles positioned adjacent to one another and normal to the wire loops. In this embodiment, the magnets 305, 310 are attached to the weapon 405 by milling a slot 610 (FIG. 6) at a practical location on the operating group 570.

A commercially available adhesive is used to mount the magnets 305, 310. This compound is also used on the rotor of a conventional frameless motor or generator. The properties of the adhesive are such that it is highly resistant to shock and vibration (as would be the case in a rotary motor). Alternatively, a new operating rod could be fabricated that is either permanently magnetized or built to accept the magnets 305, 310.

An analysis of the linear induction generator coil matrix 410 can be performed to estimate the power output. All of the parameters that affect yield can be quantified and modeled. These include the geometry of the pole-pairs and loop bundles, magnetic field strength, average gap between loops and magnets, and the time-velocity or velocity-displacement performance of the moving parts.

Figure 11:
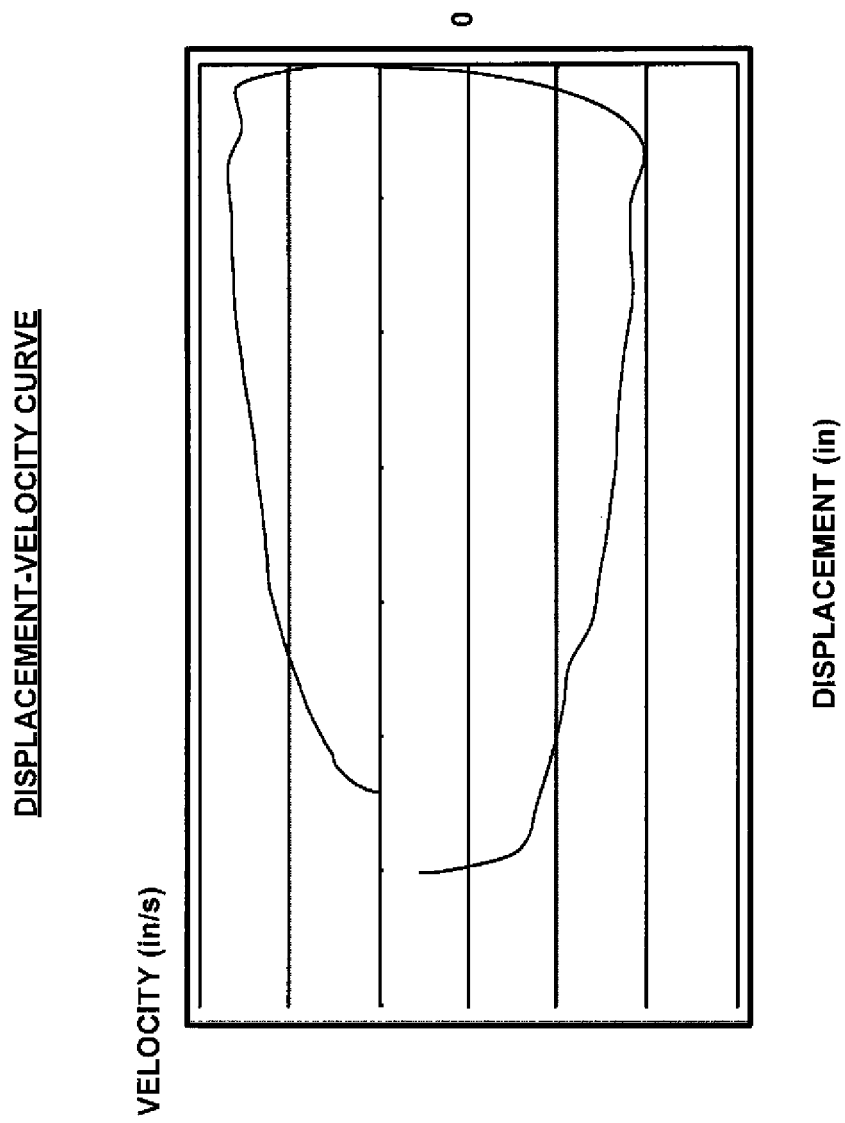
FIG. 11 is a representative velocity-displacement curve of a weapon operating forming part of the weapon system of FIG. 5.

A representative velocity-displacement curve of the weapon operating group 570 is shown in FIG. 11. Tracing the curve from point 0 and moving clockwise, a typical gas-operated weapon cycle is revealed. The sharp increase in velocity at the beginning occurs when expanding propellant gas accelerates the piston to its opening velocity. The weapon operating group 570 and the attached matrix of magnets 530 then move on their own momentum in free harmonic vibration against a drive spring. At the end of recoil, these parts are brought to a halt and the drive spring returns everything home to fire the next round.

Both portions, recoil and counter-recoil, can be utilized in energy generation. By applying the governing physics of Faraday Induction, a theoretical time curve that plots voltage output can be determined. A representative waveform is shown in FIG. 12, which describes an alternative output current, consistent with polarity switching in the linear induction generator coil matrix 410. In order to validate this output model, an objective, operable prototype was designed, constructed, and tested. FIG. 12 also overlays a voltage signal that was recorded while live firing a single shot using the present invention. Also shown in FIG. 13, is the voltage signal recorded when firing a 10-round burst from the weapon system 400.

Another novel application of the present invention is the electromagnetic dampening of the motion. In a linear induction generator application, energy still must be conserved. The electric flow in the wiring is only possible because some of the weapons kinetic energy has been bled out of the system and converted by way of an electromagnetic field. Similarly to a conventional rotary generator or motor, the induced electro-magnetic force tends to act to impede the direction of motion. If the coiling in a conventional generator is connected by an open circuit, the dynamo will spin freely. However, when connected by a load (internal or external), an amount of force must be applied. Similarly, in a linear generator, the greater the voltage produced, the greater the force that will act to halt motion. Because voltage is proportional to the velocity of the translating components, this force is analogous to a viscous damper or buffer.

Many automatic weapons already employ some type of hydraulic or pneumatic damper. These components tend to absorb and dissipate the extra kinetic energy the moving mass has at the end of a cycle (after performing work on the drive spring). The end result is a more controlled rate of fire and less of an impact load on the shooter. When the present linear inductor is installed on a weapon system, it will act against the weapon's operation at a dampening coefficient proportional to its cycle speed, strength of the magnetic field, and number of coils.

When retrofitted to an existing system, the generator is designed not to significantly impede the normal function. This is not typically a problem, as space to incorporate components that would produce a truly disruptive EMF is not available. On the purpose-built system, however, this effect could be utilized to affect the actual dynamics of the weapon cycle. The weapon could be "tuned" for more consistent firing rate and smoother operation by treating the EMF as another drive component, such as the spring stiffness or gas volume that is incorporated into the design. The feature would be reversible as well; disconnecting the circuit would disable the EMF buffering if desired. The technology would provide future weapons engineers an additional design tool to enhance the state of the art.

When the present linear induction generator coil matrix 410 is integrated into a small arms weapon system, the components are made compact and lightweight in order to be accommodated into man-portable firearms. The integration of the linear induction generator coil matrix 410 into larger systems, however, is a relatively straight-forward scale up. Self powered medium and large caliber guns impart significant energy to projectiles and by necessity, must incorporate some means of recoil mitigation. Most often, this is achieved by allowing the gun tube to slide a way along a track/buffer system which absorbs recoil energy and then resets to the in-battery position. This means of automatic firing is analogous to the small caliber weapons and a very similar approach can be taken. For example, permanent magnets may be fixed to the moving barrel within the presence of conductive loops, and mounted to the chassis.

In large and medium caliber weapon applications, the rate of fire is slower, and fewer individual shots are delivered in an engagement. However, the translational velocities can be greater in magnitude and the total displacement larger. These attributes, coupled with the space to incorporate significantly larger permanent magnets and coil volumes will greatly enhance power yield and the potential for dynamic dampening by the electro-motive force. This increase in performance per shot may compensate for the lower overall rate of fire.

It should be understood that other modifications may be made to the present design without departing from the spirit and scope of the invention. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both chemical and functional equivalents thereof. Additionally, it is intended that such equivalents include both currently known equivalents as well as equivalents developed in the future, i.e., any elements developed that perform the same function.

What is claimed is:

1. A linear induction generator for use in a weapon system to harvest energy by linear induction, wherein said weapon system has a receiver enclosing an operating group that translates within the receiver in firing, said receiver having a rectangular window opening provided therethrough to expose a rectangular area on a surface of the operating group through said window opening, said window opening having a defined height and length thereof, and;
    a matrix of magnets that are mounted onto the said rectangular area on the surface of the operating group, the magnets positioned and having dimensions such that they are accessible through said rectangular window opening and are still accessible despite possible translation of the operating group which moves the magnet positions inside the window opening defined length, and;
    a flat panel for attachment in a fixed position on the outer surface of the receiver, and having a matrix of coils, each individually mounted upon a first side of said flat panel, and whereby said coils are lined up to face the matrix of magnets in said rectangular window opening when said flat panel is permanently attached in its fixed position to said receiver, and wherein the top surfaces of such coils are coated with a low friction layer of material, and a dust cover panel is also mounted on said receiver over the reverse side of said flat panel, to cover the flat panel, and;
    whereby translation of the operating group during firing causes the matrix of magnets to slidably move in concert therewith, which movement relative with respect to the coils on said flat panel thereby inductively generates raw electric current in said coils.

2. The linear induction generator of claim 1 wherein the flat panel has a spindle assembly mounted on the first side of said flat panel comprising a plurality of spindles which extend from said first side, and;
    wherein said coils are formed on the spindles, and upon assembly of the linear induction generator, the matrix of coils and the spindle assembly are disposed oppositely relative to the matrix of magnets.

3. The linear induction generator according to claim 2, wherein the matrix of coils includes a plurality of coils that are individually wound around the spindles of the spindle assembly.

4. The linear induction generator according to claim 3, wherein each coil is formed on a single spindle.

5. The linear induction generator according to claim 3, wherein the plurality of coils include adjacent coils that are connected in series.

6. The linear induction generator according to claim 3, wherein the plurality of coils include adjacent coils that are connected in parallel.

7. The linear induction generator according to claim 3, wherein the plurality of coils include adjacent coils; and
    wherein the adjacent coils have no spacing there between and are not part of the same electric circuit.

8. The linear induction generator according to claim 3, wherein the plurality of coils include adjacent coils; and
    wherein the adjacent coils are spaced a magnet's length apart and are connected by the same circuit.

9. The linear induction generator according to claim 2, wherein the spindle assembly is constructed of any of: iron laminate or ferrite ceramic.

10. The linear induction generator according to claim 1, further comprising a rectifier circuitry for rectifying the raw electric current.

11. The linear induction generator according to claim 10, further comprising a power distribution logic circuitry for distributing the rectified raw electric current.

12. The linear induction generator according to claim 11, further comprising a power storage device for storing the distributed electric current.

13. The linear induction generator according to claim 12, wherein the power storage device includes a battery; and wherein the battery is charged at least in part by the distributed electric current.

14. The linear induction generator according to claim 13, further comprising at least one electronic device that is powered, at least in part, by the battery.

15. The linear induction generator according to claim 11, further comprising a microprocessor that is fed by the distributed electric current and that further processes the distributed electric current.

16. The linear induction generator of claim 1 wherein the operating group rectangular area is a milled slot provided thereon as a place for attachment of said magnets, and said magnets being attached there with an adhesive.

17. The linear induction generator according to claim 1 wherein the magnets are mounted with non-ferrous spacers between each adjacent magnet.

18. The linear induction generator according to claim 1, wherein the weapon system is any one of: a small caliber weapon system, a large caliber or a mortar weapon system.

19. The linear induction generator according to claim 1, wherein the matrix of magnets comprises a plurality of permanent magnets.

20. The linear induction generator according to claim 1, wherein the matrix of magnets comprises a plurality of adjacent permanent magnets, and
wherein each permanent magnet generates a magnetic field that is opposite to the magnetic fields of its adjacent permanent magnets.

21. The linear induction generator according to claim 1, wherein the low friction layer of materials is polytetrafluoroethylene, and said layer further serves as a wear resistant layer and the layer also maintains a predetermined gap between the matrix of magnets and the matrix of coils.

* * * * *